United States Patent
Niklas

[11] 3,746,121
[45] July 17, 1973

[54] ULTRASOUND PULSE ECHO METHOD AND APPARATUS FOR DETERMINING ACOUSTIC VELOCITY OF MATERIALS

[76] Inventor: Ludwig Niklas, 5023 Lovenich Bei, Cologne, Germany

[22] Filed: Oct. 14, 1970

[21] Appl. No.: 80,597

[30] Foreign Application Priority Data
Oct. 24, 1969 Germany.................. P 19 53 567.2

[52] U.S. Cl................. 181/.5 AP, 340/3 C, 340/5 S
[51] Int. Cl........................... G01s 9/66, H04b 11/00
[58] Field of Search ................. 181/.5 AP; 340/.5 S, 340/3 C

[56] References Cited
UNITED STATES PATENTS
3,088,540  4/1963  Kokesh................................ 340/5 S Primary Examiner—Benjamin A. Borchelt
Assistant Examiner—J. V. Doramus
Attorney—Harry E. Aine

[57] ABSTRACT

A method and apparatus for determining directly the acoustic velocity $c_m$ of a material from the comparison of the ultrasonic pulse echoes obtained from the material positioned on the bottom surface of a fluid bath container with the ultrasonic pulse echoes received from the bottom of the bath container with the material removed therefrom. A cathode ray display apparatus incorporating an expandable pusle echo time base and a fixed calibrated acoustic velocity scale are employed for a direct reading from the scale of the acoustic velocity of the material.

6 Claims, 2 Drawing Figures

Patented July 17, 1973  3,746,121

INVENTOR.
LUDWIG NIKLAS
BY Harry E. Qine

ULTRASOUND PULSE ECHO METHOD AND APPARATUS FOR DETERMINING ACOUSTIC VELOCITY OF MATERIALS

BACKGROUND OF THE INVENTION

Based on known physical laws, conclusions with respect to material properties, such as Young's modulus, shear modulus, and Poisson's ratio, can be drawn from the material's acoustic velocity and, for this purpose, it is necessary to determine the acoustic velocity of such materials. It is commonly known to determine the acoustic velocity by ultrasound using the pulse-echo method and measuring the transit time of the pulse through the material, the acoustic velocity at known thickness of the product resulting as the quotient from thickness and transit time. But this requires carrying out two different measurements in sequence, firstly to gauge the thickness of the product and then to measure the sound transit time in the material. Deviations from accuracy of either measurement can influence the sensitivity of the whole measurement.

It is also known to use quartz standards or liquid-filled interferrometers or other transit time standards to increase the accuracy of the transit time measurement.

BRIEF SUMMARY OF THE PRESENT INVENTION

The present invention relates to an improved method and apparatus for making acoustic velocity measurements, especially by ultrasound, of material samples by comparison of their typcial sound propagation velocity with that of a known substance, preferably a fluid.

The present invention simplifies acoustic velocity measurements by measuring transit times only instead of gauging mechanically the thickness and additionally measuring the transit time, and thus speeding up the measurement. In accordance with the present invention there is provided in front of the luminous screen of an associated cathode ray tube a scale standardized in acoustic velocity and arranged so that its zero graduation is positioned in coincidence or alignment or can be adjusted to this position with the entry echo pulse or indication of the measured material sample on the CRT screen, and its graduation corresponding to the acoustic velocity of the liquid positioned coincident with the backwall echo indication of the material sample.

The method for making acoustic velocity measurements in accordance with this invention provides placing the sample on the tank bottom and acoustically radiating it at right angles, producing the above-mentioned coincidence or alignment adjustment by time base scale expansion of the pulse-echo apparatus, then removing the sample and reading directly on the velocity scale the echo value from the tank bottom as the acoustic velocity value of the sample.

The simplified method of the present invention comprises first measuring the transit time of the sound pulse in the sample material to be tested and then the transit time of the sound pulse in a fluid whose acoustic velocity is known with great accuracy as, for example, water. It is important for this method to utilize a travel distance in the fluid equal to the material thickness by removing the sample after the transit time measurement has been taken in the sample. This assures that the travel distance in the sample is exactly equal to the travel distance in the fluid which is employed for the measurement. The transit time in the material results from the time difference between the instant of sound entry into the material and the backwall echo from the material.

Thus, the instant of entry is clearly fixed as a value on the time base of the luminous pattern of the cathode ray tube. The associated transit time for the equal fluid distance results from the difference between this same fixed instant and the echo from the tank bottom, viz. as a measurement of an identical distance whose associated travel time, however, is longer when its acoustic velocity is lower than that of the material under test. With $c_m$ representing the acoustic velocity of the material under test, $c_f$ that of the liquid, $t_m$ the transit time in the material, and $t_f$ the transit time in the equal fluid distance, then, owing to the equal length of the travelled distance, $c_m t_m = c_f t_f$, and consequently $c_m = (t_f/t_m) c_f$ The quotient $t_f/t_m$ is developed from the transit time measurement according to the invention and, by multiplication with the acoustic velocity $c_f$ of the fluid, results in the acoustic velocity $c_m$ of the material, so that reading of the time values and multiplication by the acoustic velocity is advantageously omitted and a direct readout of $c_m$ is possible.

Another embodiment of the inventon provides producing a marker pulse which is variably delayed in relation to the initial pulse and which is superimposed on the CRT screen in coincidence with the echo from the tank bottom prior to the measurement, and then to read the acoustic velocity of the material without removing the material sample. Another feature of this invention provides aligning the entry echo automatically with the zero scale graduation, for example by a commonly known device for automatically starting the time base by the first echo or reflection. In addition, the invention may also be realized by measuring and storing the transit time value between the entry echo and the marker pulse, then dividing by the transit time value between entry echo and backwall echo from the material sample, and multiplying the result by the known acoustic velocity value of the liquid, the final result being indicated or printed.

DESCRIPTION OF THE PREFERRED EMBODIMENTS

Figure 1:
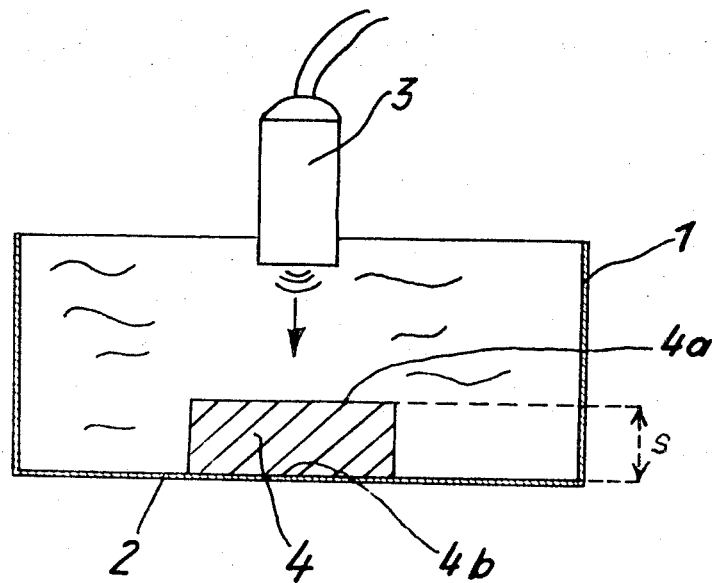
FIG. 1 shows a schematic view of the liquid tank with sample material and probe.

A container such as a tank 1 is filled with a liquid such as water and sample material 4 is placed on the bottom 2 of the tank. This sample is acoustically radiated by a pulse from an ultrasound probe 3 perpendicularly to the bottom 2. The sample 4 may be of steel, aluminum, or other metal, plastic, glass, or a ceramic compound. The sound travel distance in the material 4 is s. On the luminous screen 9 of a cathode ray tube which is fragmentarily represented in FIG. 2, the initial pulse 5 from probe 3 is drawn on the time base 5a. The sound entry into the material 4 is represented by the entry or front surface echo pulse 6, whereas the echo pulse 7 from the sample material backwall appears spaced from the latter. The echo 8 from the tank bottom obtained after the sample has been removed appears on the time base displaced to the right, provided that the acoustic velocity in the fluid is lower than that of the material of the sample. A transparent film 10 is placed over the luminous screen 9 with at least one scale 11 calibrated in acoustic velocity.

When the sample 4 is inserted and the probe 3 is excited, the entry echo 6 is displayed on the luminous screen due to the sound beam impinging on the surface 4a. This is represented by the point $P_{1m}$ in FIG. 2. The point $P_{2m}$ represents the pertinent backwall reflection echo 7 from the material bottom 4b. The transit time between pulses 6 and 7 is $t_m$.

After the sample 4 is removed from the tank and the probe 3 again activated, the echo 6 does not appear, of course, but the location of the echo signal 6 obtained previously may be fixed on the transit time scale by a mark or the like at the point $P_{1f}$. Since the tank bottom 2 coincides with the sample bottom 4b, in both cases the same travel distance $s$ (FIG. 1) is measured, the point $P_{2f}$ representing the tank bottom reflection pulse appearing at the right in FIG. 2 due to the longer transit time $t_f$.

Now, the zero index of the scale 11 is made to coincide with the line running to entry echo 6, i.e., the points $P_{1m}$ and $P_{1f}$. The scale 11 of the dial 10 is calibrated and is fixed. The value of the acoustic velocity $c_m$ of the sample 4 cannot be determined from FIG. 2 by a simple projection of the backwall echo 7 on the scale 11, since $t_m$, $t_f$ or $t_f - t_m$ can indeed be measured on the time base, but not $t_f : t_m$. This value ($c_{m11}$) may be obtained in accordance with this invention by spreading (or expanding) the time base scale 5a of the pulse-echo apparatus until the backwall echo 7 from the material is coincident with the graduation on scale 11 corresponding to the acoustic velocity of the liquid. This scale mark $c_f$ is demonstrated on a dash scale graduation below the scale 11.

Figure 2:
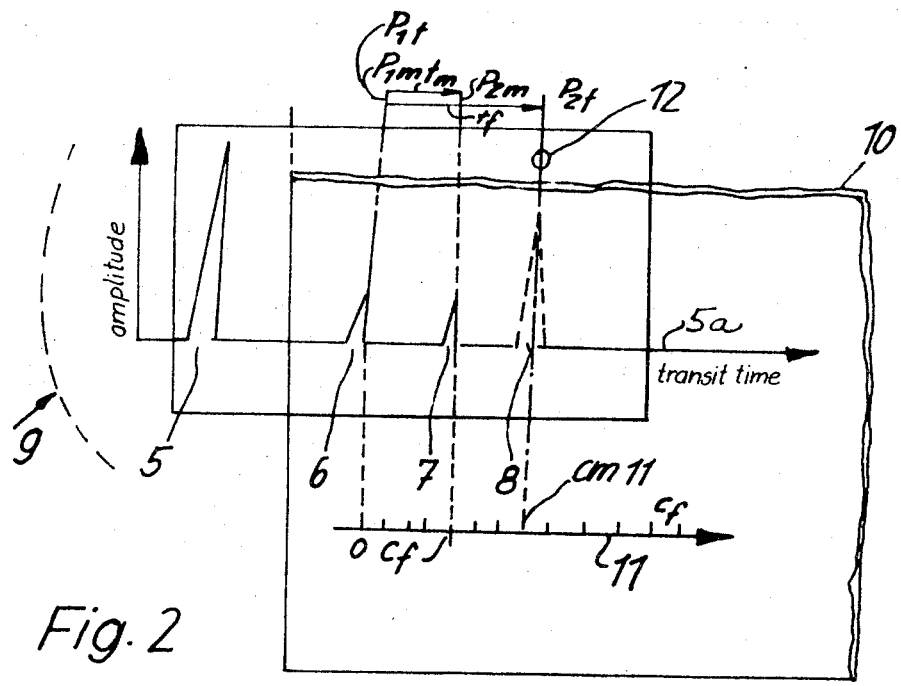
FIG. 2 shows a schematic representation of the transit time indication on the luminous screen pattern of a cathode ray tube and a scale calibrated in acoustic velocity.

Another simplified embodiment of the method uses a marker pulse which is delayed in time relative to the initial pulse 5 by a settable amount, this pulse being indicated as mark 12 shown in FIG. 2. Like the sound echoes, the marker pulse is superimposed along the time base on the CRT screen 9, and the marker 12 is set to coincide with the bottom echo 8 from the tank 1 before inserting the material sample 4. After the material sample has been inserted, this marker 12 appears on the CRT screen beside the entry echo 6 and the backwall echo 7. When the entry echo 6 is aligned with the zero scale graduation of the scale 11, either by hand or by means of an automatic device, and the backwall echo 7 moved to the value of the acoustic velocity of the fluid, $c_f$, by expanding the time base of the pulses, the mark 12 of the marker pulse indicates on scale 11 the acoustic velocity of the material sample. The entry echo 6 from the sample 4 may be automatically made to coincide with or to be aligned with the zero scale graduation of the scale 11 by use of a commonly known device which starts the base line in response to the first reflection.

The above described method can be further simplified by utilizing a computer (not shown), which stores the entry echo-to-marker pulse transit time, divides it by the entry echo-to-backwall echo transit time, and multiplies the result by the advance keyed-in value of the known acoustic velocity $c_f$ of the liquid, and indicates or prints the outcome of the calculation, namely the acoustic velocity $c_m$.

What is claimed is:

1. The method for determining the acoustic velocity of a sample material comprising the steps of irradiating the sample material on the bottom of a container of fluid which has a known acoustic velocity with an acoustic pulse to obtain both a pulse echo from the entry surface of the material and a pulse echo from the backwall of the material on a time base, irradiating the container fluid with another acoustic pulse with the sample material removed from the bath to obtain an echo pulse from the bottom surface of the container on said time base, aligning the zero value graduation of an acoustic velocity scale with the entry surface echo pulse on the time base, expanding the time base until the backwall echo pulse coincides with the graduation on the acoustic velocity scale designating the known acoustic velocity of the fluid, and obtaining the acoustic velocity reading of the material from the acoustic velocity scale at the position of the bottom echo pulse.

2. The method as claimed in claim 1 comprising the step of generating a marker pulse delayed a selected time from the initial acoustic pulse, the marker pulse being made to coincide on said time base with said bottom echo pulse, said time base being expanded so that said backwall echo pulse on said time base coincides with said fluid acoustic velocity graduation on said scale, said marker pulse on said expanded time base coinciding with the acoustic velocity graduation of said material on said scale.

3. The method as claimed in claim 2 including the step of determining the transit time between the entry echo and the marker pulse, dividing this value by the transit time between the entry echo pulse and backwall echo pulse, and multiplying the result by the known acoustic velocity of the fluid.

4. Apparatus for determining the acoustic velocity of a sample material comprising means for irradiating the sample material on the bottom of a container of fluid which has a known acoustic velocity with an acoustic pulse to obtain both a pulse echo from the entry surface of the material and a pulse echo from the backwall of the material on a time base, said means operating to irradiate the container fluid with another acoustic pulse with the sample material removed from the bath to obtain an echo pulse from the bottom surface of the container on said time base, means for aligning the zero value graduation of an acoustic velocity scale with the entry surface echo pulse on the time base, and means for expanding the time base until the backwall echo pulse coincides with the graduation on the acoustic velocity scale designating the known acoustic velocity of the fluid, the acoustic velocity reading of the material being obtained from the acoustic velocity scale at the position of the bottom echo pulse.

5. Apparatus as claimed in claim 4 including means for displaying the pulses along said time base on a cathode ray screen, said velocity scale being superimposed on said screen such that said pulses may be aligned with selected graduation along said scale.

6. Apparatus as claimed in claim 5 wherein said scale is provided with a graduation at the point of the acoustic velocity of said fluid.

* * * * *